(12) United States Patent
Hattori et al.

(10) Patent No.: US 10,158,863 B2
(45) Date of Patent: Dec. 18, 2018

(54) IMAGE CODING APPARATUS, IMAGE CODING METHOD, AND RECORDING MEDIUM, AND IMAGE DECODING APPARATUS, IMAGE DECODING METHOD, AND RECORDING MEDIUM

(71) Applicant: CANON KABUSHIKI KAISHA, Tokyo (JP)

(72) Inventors: Hideaki Hattori, Kawasaki (JP); Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 538 days.

(21) Appl. No.: 14/328,404

(22) Filed: Jul. 10, 2014

(65) Prior Publication Data
US 2015/0016539 A1    Jan. 15, 2015

(30) Foreign Application Priority Data
Jul. 12, 2013 (JP) ................................. 2013-146306

(51) Int. Cl.
| | |
|---|---|
| *H04N 19/176* | (2014.01) |
| *H04N 19/137* | (2014.01) |
| *H04N 19/119* | (2014.01) |
| *H04N 19/70* | (2014.01) |
| *H04N 19/436* | (2014.01) |
| *H04N 19/44* | (2014.01) |

(52) U.S. Cl.
CPC ......... *H04N 19/176* (2014.11); *H04N 19/119* (2014.11); *H04N 19/137* (2014.11); *H04N 19/436* (2014.11); *H04N 19/70* (2014.11); *H04N 19/44* (2014.11)

(58) Field of Classification Search
CPC .. H04N 19/119; H04N 19/137; H04N 19/176; H04N 19/583

USPC ..................................................... 375/240.24
See application file for complete search history.

(56) References Cited

U.S. PATENT DOCUMENTS

| | | | | |
|---|---|---|---|---|
| 2009/0323809 | A1* | 12/2009 | Raveendran | H04N 19/46 375/240.16 |
| 2012/0230399 | A1* | 9/2012 | Segall | H04N 19/176 375/240.08 |
| 2012/0328003 | A1* | 12/2012 | Chien | H04N 19/176 375/240.03 |
| 2014/0003504 | A1* | 1/2014 | Ugur | H04N 19/00757 375/240.12 |

OTHER PUBLICATIONS

Flynn, et al., "High Efficiency Video Coding (HEVC) Range Extensions text specification: Draft 3", Joint COllaborative Team on Video Coding (JCT-VC) of ITU-T SG 16 WP 3 and ISO/IEC JTC 1/SC 29/WG 11, 13th Meeting: Incheon, KR, Apr. 18-26, 2013 Document: JCTVC-M1005_v1, pp. 281-289.

* cited by examiner

*Primary Examiner* — Tung T Vo
*Assistant Examiner* — Kristin Dobbs
(74) *Attorney, Agent, or Firm* — Canon USA, Inc. I.P. Division

(57) ABSTRACT

An image coding apparatus that codes a moving image composed of a plurality of pictures, includes a determination unit configured to define a tile set in a manner that a size of the tile set including one or more tiles obtained by dividing a picture, which corresponds to a size of the tile set at which coding can be independently performed, is set to be smaller than or equal to a predetermined size, and a coding unit configured to code the picture on the basis of the tile set defined by the determination unit.

12 Claims, 11 Drawing Sheets

FIG. 6

| | PICTURE MAXIMUM NUMBER OF PIXELS | TILE SET MAXIMUM NUMBER OF HORIZONTAL PIXELS | TILE SET MAXIMUM NUMBER OF VERTICAL PIXELS |
|---|---|---|---|
| LEVEL 4 | 2,228,224 | 1024 | 1088 |
| LEVEL 5 | 8,912,896 | 2048 | 2176 |
| LEVEL 6 | 35,651,584 | 2048 | 2176 |

FIG. 7

| PROFILE | MAIN PROFILE | | | MCTS PROFILE | | |
|---|---|---|---|---|---|---|
| LEVEL | PICTURE MAXIMUM NUMBER OF PIXELS | TILE SET MAXIMUM NUMBER OF HORIZONTAL PIXELS | TILE SET MAXIMUM NUMBER OF VERTICAL PIXELS | PICTURE MAXIMUM NUMBER OF PIXELS | TILE SET MAXIMUM NUMBER OF HORIZONTAL PIXELS | TILE SET MAXIMUM NUMBER OF VERTICAL PIXELS |
| LEVEL 4 | 2,228,224 | NO RESTRICTION | NO RESTRICTION | 2,228,224 | 1024 | 1088 |
| LEVEL 5 | 8,912,896 | NO RESTRICTION | NO RESTRICTION | 8,912,896 | 2048 | 2176 |
| LEVEL 6 | 35,651,584 | NO RESTRICTION | NO RESTRICTION | 35,651,584 | 2048 | 2176 |

IMAGE CODING APPARATUS, IMAGE CODING METHOD, AND RECORDING MEDIUM, AND IMAGE DECODING APPARATUS, IMAGE DECODING METHOD, AND RECORDING MEDIUM

BACKGROUND OF THE INVENTION

Field of the Invention

The present invention relates to an image coding apparatus, an image coding method, and a recording medium, and an image decoding apparatus, an image decoding method, and a recording medium. In particular, the invention relates to a coding method and a decoding method for an image in which respective pictures are divided into rectangular tiles.

Description of the Related Art

With a current progress in digital technologies, digital moving image capturing at a high resolution in a digital camera and a digital video camera is widely spread. The digital moving image is generally compressed (coded) to be efficiently recorded in a recording medium represented by a flash memory, and H.264/MPEG-4 AVC (hereinafter, which will be referred to as H.264) is widely used as a coding system for the moving image.

In recent years, an activity for setting an international standardization of a further more efficient coding system as a succession of H.264 has started, and Joint Collaborative Team on Video Coding (JCT-VC) has been established between ISO/IEC and ITU-T. In JCT-VC, a standardization of High Efficiency Video Coding system (hereinafter, which will be referred to as HEVC) has been progressed.

FIG. 10 illustrates a processing order in coding processing in the HEVC. As illustrated in FIG. 10, the coding processing is performed by dividing one picture in units of coding tree blocks (hereinafter, which will be referred to as CTB) corresponding to a previously set square composed of 64 pixels×64 pixels or the like. The coding is sequentially performed in the picture from the CTB on the upper left→the upper right→the bottom left→the bottom right (raster scan order), and a coding stream (hereinafter, which will be simply referred to as stream) is output. In decoding processing, decoding is performed in the same processing order as the coding processing, and a decoded image is output.

For the standardization of the HEVC, various coding tools are widely reviewed in terms of a facility of the mounting and a reduction in the processing time as well as an improvement in the coding efficiency. Among them, parallel processing of coding and decoding, a technique called slice division for dividing one picture in the coding order in a horizontal direction for purposes of increasing an error resilience and the like, a technique called tile division for dividing one picture into rectangular areas, and the like are proposed (JCT-VC contribution, JCTVC-M1005-v1.doc, the Internet <http://phenix.int-evry.fr/jct/doc_end_user/documents/13_Incheon/wg11/>: Non-patent Document 1).

Speeding-up by the parallel processing of coding and decoding is realized by using the slices or the tiles, and also the amount of memory used for a coding program and a decoding program can be reduced. According to the HEVC, these slice division and tile division can also be used in combination.

In addition, Non-patent Document 1 describes a technique called Motion-Constrained Tile Sets (MCTS) in which the above-described tile division is utilized, and only a part of tiles can be independently decoded from a picture having a continuous stream. In this MCTS, a tile set constituted by one or more tiles within the picture is defined, and only this tile set can be reproduced as a partial moving image from the coded stream.

When an MCTS supplemental enhancement information (SEI) message is included in the stream, the coding is performed under the following restrictions in this video sequence.

The coding is performed while a similar tile division is used by each picture in the video sequence.

The coding is performed while similar tile sets used in all the pictures in the video sequence. That is, sizes and positions of the tile sets are the same in all the pictures.

With regard to the MCTS coding, the coding is not performed by using a motion vector that uses a reference pixel outside the relevant tile set on a reference picture.

In the decoding, in a case where this MCTS SEI message is included in the stream, it is possible to extract only the tile set designated as the MCTS from the continuous picture to be decoded and reproduced as the partial moving image at a high speed. By using the MCTS, for example, it is possible to realize a region of interest (ROI) in which only a region of interest set by a user is decoded at a high speed.

When a moving image constituted by one or more picture groups at a high resolution like horizontal 4096 pixels×vertical 2048 pixels (hereinafter, which will be described as 4096×2048 pixels) is decoded, the decoding can be desirably performed in parallel by using a plurality of image decoding apparatuses. For example, if a picture having 4096×2048 pixels can be decoded in parallel by using four image decoding apparatuses provided with a processing capability of 2048×1024 pixels, reuse of the image decoding apparatuses is facilitated, and it is possible to realize a cost reduction.

FIG. 8 illustrates an example of an image decoding system using the plurality of image decoding apparatuses. Each of image decoding apparatuses 801 is provided with a DRAM 803 corresponding to a memory outside a chip and an SRAM 802 corresponding to a memory inside the chip. Data transfer between the image decoding apparatuses 801 is connected by an inter-chip communication apparatus 804. It is noted that an interface for inputting a stream and an interface for outputting a decoded image are omitted from FIG. 8, and a description thereof is also omitted.

As described above, in the HEVC, the coding and decoding are performed in the raster scan order in units of the CTB within the picture in principle. Furthermore, in the HEVC, like an intra prediction or the like, a plurality of processing where a reference is made to a pixel of an upwardly adjacent CTB or a coding parameter exist in the processing on the processing target CTB. To refer to the pixel of the upwardly adjacent CTB or the coding parameter, a horizontal line buffer for holding a capacity for one line is to be used. When the image decoding apparatuses are mounted as a system LSI, this horizontal line buffer is mounted as the SRAM 802 of FIG. 8 in general, and when the picture having a high resolution like 4096×2048 pixels is set as a decoding target, the SRAM 802 having a large capacity is to be used.

For example, a case where a stream is decoded in which the picture having 4096×2048 pixels is divided by a tile division into four pieces of tile sets having 4096×512 pixels will be supposed. In order that the respective tile sets are decoded in parallel by the four image decoding apparatuses 801, each of the image decoding apparatuses 801 is to be provided with the horizontal line buffer corresponding to 4096 pixels as the SRAM 802, and a problem occurs that a memory cost is increased.

The tiles decoded by the respective image decoding apparatuses 801 in FIG. 8 are written to the DRAM 803. On the other hand, when the picture is divided into tile sets and the plurality of tile sets are decoded in parallel by the plurality of image decoding apparatuses 801, a motion vector that refers to pixels in different tile sets on the reference picture may be used in some cases in a motion compensation.

When the above-described stream is decoded, each of the image decoding apparatuses 801 is to refer to not only the decoding pixels on the tile sets on the DRAM 803 connected to itself but also the decoding pixels on the tile sets recorded on the DRAMs 803 connected to the other image decoding apparatuses 801. To refer to data on the DRAMs corrected to the other image decoding apparatuses 801 in FIG. 8, the inter-chip communication apparatus 804 is used. The inter-chip communication apparatus 804 is desirably not used because the cost is high and the power consumption is high in general.

When the picture is divided into the tile sets as described above and the respective divided tile sets are decoded in parallel by the plurality of image decoding apparatuses 801 too, problems occur that a memory cost is increased and the power consumption by the inter-chip communication apparatus 804 is increased.

The present invention is proposed in view of the above-described issues and aims at reducing memory costs of respective image decoding apparatuses and power consumption by an inter-chip communication apparatus in a use case in which a picture having a high resolution is decoded in parallel by using a plurality of image decoding apparatuses.

SUMMARY OF THE INVENTION

As a measure to solve the above-described issues, a representative image coding apparatus according to an aspect of the present invention includes the following configuration. That is, the image coding apparatus that codes a moving image composed of a plurality of pictures, includes: a deciding unit configured to define a tile set in a manner that a size of the tile set including one or more tiles obtained by dividing a picture, which corresponds to a size of the tile set at which coding can be independently performed, is set to be smaller than or equal to a predetermined size; and a coding unit configured to code the picture on the basis of the tile set defined by the deciding unit.

In addition, a representative image decoding apparatus according to another aspect of the present invention includes the following configuration. That is, the image decoding apparatus that decodes a stream obtained by coding a moving image composed of a plurality of pictures, includes: an obtaining unit configured to obtain a tile set defined in a manner that a size of the tile set including one or more tiles obtained by dividing a picture, which corresponds to a size of the tile set at which decoding can be independently performed, is set to be smaller than or equal to a predetermined size; and a decoding unit configured to decode the picture on the basis of the tile set obtained by the obtaining unit.

Further features of the present invention will become apparent from the following description of exemplary embodiments with reference to the attached drawings.

According to the aspects of the present invention, in the use case in which the picture having the high resolution is decoded in parallel by using the plurality of image decoding apparatuses, the memory costs of the respective image decoding apparatuses and the power consumption by the inter-chip communication can be reduced.

BRIEF DESCRIPTION OF THE DRAWINGS

FIG. 6 illustrates tile set maximum numbers of horizontal and vertical pixels of a tile set according to a third exemplary embodiment.

FIG. 7 illustrates tile set maximum numbers of horizontal and vertical pixels of a tile set according to a fourth exemplary embodiment.

DESCRIPTION OF THE EMBODIMENTS

Exemplary Embodiments

Hereinafter, with reference to the accompanying drawings, exemplary embodiments of the present invention will be described in detail. It is noted that configurations according to the following exemplary embodiments are merely examples, and the present invention is not limited to the illustrated configurations.

First Exemplary Embodiment

According to a first exemplary embodiment of the present invention, each picture in a moving image is divided into a plurality of tiles, and all the tiles in the picture are coded as a part of a tile set constituting MCTS (hereinafter, which will be simply referred to as tile set), so that a stream is generated. Furthermore, in the stream of the present invention, a tile set maximum number of horizontal pixels and a tile set maximum number of vertical pixels which indicate a maximum size (predetermined size) of the respective tile sets constituting the MCTS in the picture are limited to be lower than or equal to previously set numbers of pixels. According to the present exemplary embodiment, the tile set maximum numbers of horizontal and vertical pixels of the respective tile sets are respectively limited to be lower than or equal to 2048 pixels. A size of the CTB according to the present exemplary embodiment is set as 32×32 pixels.

Figure 2:
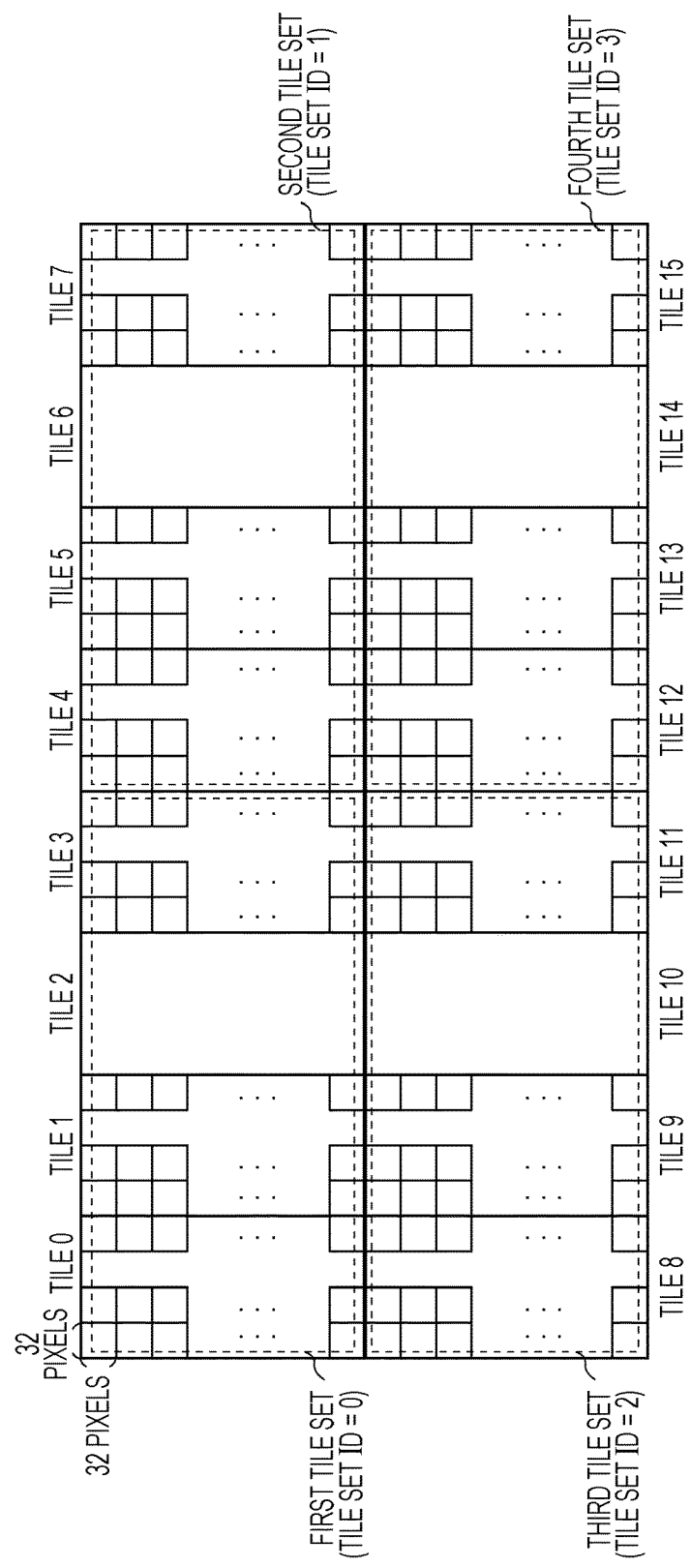
FIG. 2 illustrates a tile division and tile sets according to the first exemplary embodiment.

FIG. 2 illustrates a tile division and tile sets according to the first exemplary embodiment. In FIG. 2, a picture having horizontal 4096×vertical 2048 pixels is divided into 16 tiles having 512×1024 pixels, and also all the tiles in the picture are included in any one of the tile sets. The respective tile sets are constituted by four tiles, and a size of each tile set is 2048×1024 pixels.

As described above, to constitute the MCTS, the respective pictures in the sequence are to be coded by using a similar tile division. Therefore, all the pictures in the sequence are subjected to the tile division by the division method illustrated in FIG. 2 to be coded.

According to an image coding format of the present invention, the coding is performed in units of the CTBs, and a size of each tile is a multiple of the CTB. Numerals in FIG. 2 indicate spatial coordinates of the respective CTBs in the picture. A coding and decoding order inside each tile is a raster scan order in which the CTB is set as a unit. In a tile 1 of FIG. 2, the coding and decoding are performed in the stated order of (0, 0)→(0, 1)→ . . . →(0, 15)→(1, 0)→(1, 1)→ . . . →(1, 15)→ . . . →(30, 15)→(31, 15).

Figure 3:
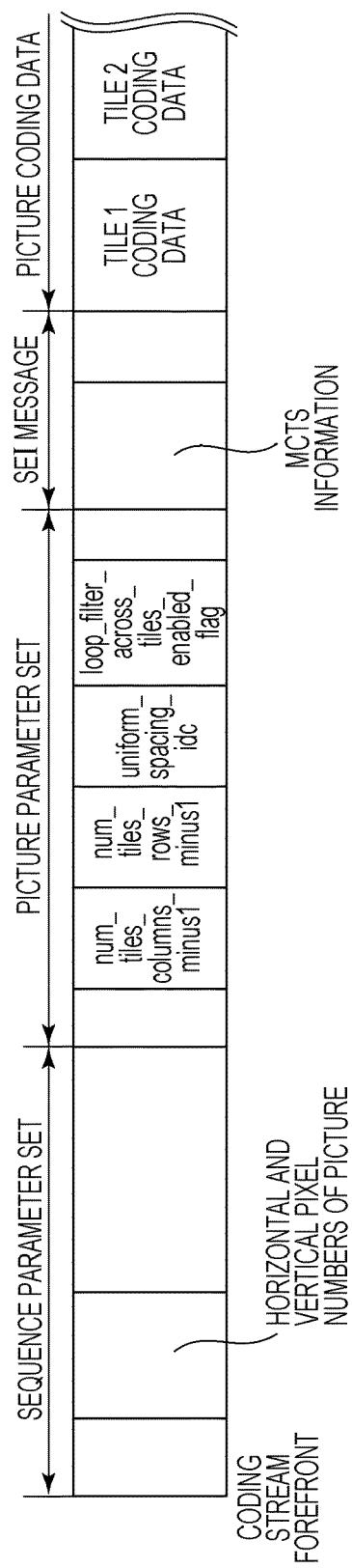
FIG. 3 illustrates an example of a coding stream according to the first exemplary embodiment.

FIG. 3 illustrates an example of a stream including the MCTS tile sets with the restriction on the number of pixels according to the first exemplary embodiment. The configuration of this stream is described in Non-patent Document 1. As illustrated in FIG. 3, the numbers of horizontal and vertical pixels of the picture are inserted into a sequence parameter set, and tile information is inserted into a picture parameter set.

As the tile information in the picture parameter set, first, information on the numbers of horizontal and vertical tiles in the picture is inserted. num_tile_columns_minus1 and num_tile_rows_minus1 of FIG. 3 respectively indicate numbers obtained by respectively subtracting 1 from the numbers of horizontal and vertical tiles in the picture. In a case where the number of horizontal tiles or the number of vertical tiles are 2 or higher (in a case where the tile division is performed), uniform_spacing_flag corresponding to information indicating whether or not the sizes of the respective tiles are the same is inserted. According to the present exemplary embodiment, it is supposed that each tile has the same size, and uniform_spacing_flag=1 is set. The numbers of horizontal and vertical pixels of each tile in the case of uniform_spacing_flag=1 can be calculated by division of the numbers of horizontal and vertical pixels of the picture by the numbers of horizontal and vertical tiles. The present invention can also be applied when uniform_spacing_flag=0 is set and the numbers of horizontal and vertical pixels of each tile are directly designated. loop_filter_across_tiles_flag indicating whether or not the filter processing is performed between the tiles is inserted following uniform_spacing_flag. An SEI message including MCTS information is inserted following the picture parameter set including the tile information. For example, by setting the coding parameter in the MCTS information as described below, it is possible to designate the tile sets constituting the MCTS illustrated in FIG. 2.

num_sets_in_message_minus1=3

(This is a number obtained by subtracting 1 from the number of tile sets coded as the MCTS and stored in the SEI message. By setting 3, this indicates that the number of tile sets is 4 in FIG. 2.)

With regard to the first tile set (tile set ID=0) in FIG. 2, the parameter in the MCTS SEI message is set as follows.

mcts_id=0

(This is a tile set ID for identifying tile sets that can be defined in plural numbers in the picture. It is possible to set an arbitrary number between 0 and 255. For example, by setting 0, this indicates that the first tile set ID in FIG. 2 is 0.)

num_tile_rects_in_set_minus1=0

(This syntax corresponds to a number obtained by subtracting 1 from the number of rectangular tile groups included in the respective tile sets. Since each of the tile sets according to the present exemplary embodiment is constituted by one rectangular tile group, 0 is set.)

top_left_tile_index[0][0]=0

(This is an index of the tile located on the top left in the tile set. By setting 0, this indicates that the tile 0 in FIG. 2 is located on the top left of the first tile set.)

bottom_right_tile_index[0][0]=3

(This is an index of the tile located on the bottom right in the tile set. By setting 3, this indicates that the tile 3 in FIG. 2 is located on the bottom right of the rectangular tile group constituting the first tile set.)

Similarly, the above-described information is also set for the remaining tile sets. For example, the setting for the fourth tile set (tile set ID=3) in FIG. 2 is as follows.

mcts_id=3 num_tile_rects_in_set_minus1=0 top_left_tile_index[3][0]=12 bottom_right_tile_index[3][0]=15

Figure 1:
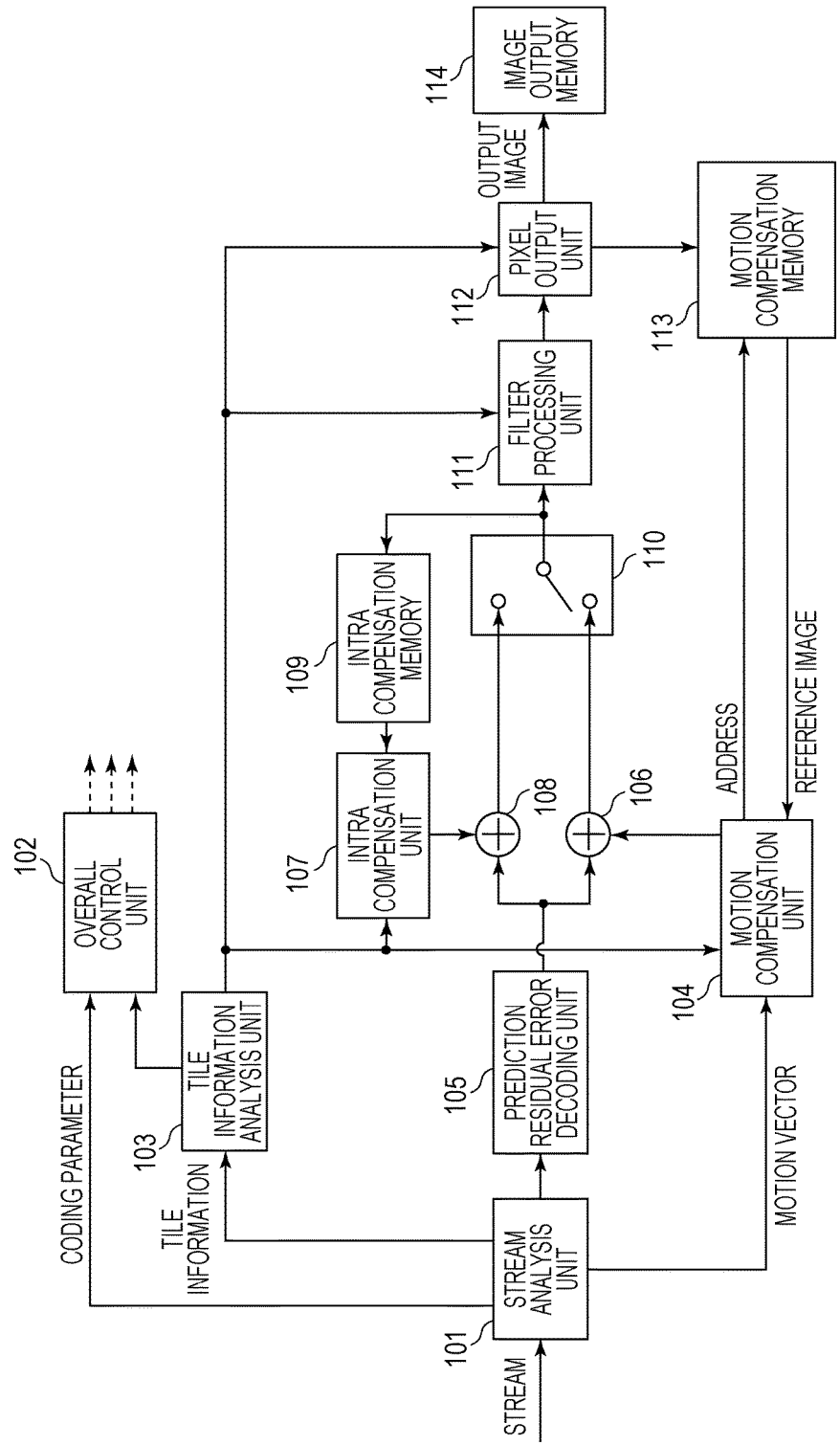
FIG. 1 illustrates an image decoding apparatus according to a first exemplary embodiment.

FIG. 1 illustrates contents of an image decoding apparatus that decodes a stream in conformity to the above-described image coding format. As illustrated in FIG. 1, this image decoding apparatus is constituted by a stream analysis unit 101, an overall control unit 102, a tile information analysis unit 103, a motion compensation unit 104, a prediction residual error decoding unit 105, an addition unit 106, an intra compensation unit 107, an addition unit 108, an intra compensation memory 109, a selection unit 110, a filter processing unit 111, a pixel output unit 112, a motion compensation memory 113, and an image output memory 114.

The stream analysis unit 101 inputs a stream and performs an analysis on a sequence parameter set, a picture parameter set, header information, or an SEI message to calculate tile information or information related to the MCTS. The stream analysis unit 101 also performs separation of a motion vector included in the stream and a coded prediction residual error. The overall control unit 102 analyzes a coding mode and a coding parameter (a motion prediction or an intra prediction, and an intra prediction mode) corresponding to results of the analysis on the header information from the stream analysis unit 101. The overall control unit 102 performs controls of the respective processing in accordance with the analyzed coding mode and coding parameter.

The tile information analysis unit 103 receives the tile information such as the numbers of horizontal and vertical tiles from the stream analysis unit 101 and calculates the numbers of horizontal and vertical pixels of the tile. The tile information analysis unit 103 also receives the information related to the MCTS from the stream analysis unit 101 and calculates the numbers of horizontal and vertical pixels of the respective tile sets constituting the MCTS. The calculated information related to the tiles and the tile sets is transmitted to respective associated processing. As will be described below, the tile information analysis unit 103 also checks whether or not the numbers of horizontal and vertical pixels of the tile sets in the stream satisfy a restriction for the decoding support target, and in a case where the restriction is not satisfied, the tile information analysis unit 103 outputs an error signal to the overall control unit 102.

In a case where the coding mode for the decoding processing target block is the motion prediction, the motion compensation unit 104 generates an address with respect to the motion compensation memory 113 where the image decoded for the motion prediction is recorded in accordance with the motion vector and the tile information. The motion compensation unit 104 generates a reference block for the motion compensation by using a reference image read from the motion compensation memory 113 (or performs filter processing or the like in a case where the motion vector indicates a non-integer value).

According to the present exemplary embodiment, when the motion vector that use the pixel on the tile set other than the tile set of the processing target on the reference picture is input, the motion compensation unit 104 outputs an error signal indicating that the motion vector is not supported for the decoding, to the overall control unit 102.

The prediction residual error decoding unit 105 performs arithmetic decoding of the coded prediction residual error and inverse quantization and inverse orthogonal transform to generate a prediction residual error. The addition unit 106 performs addition of the reference block output from the motion compensation unit 104 with the prediction residual error decoded by the prediction residual error decoding unit 105.

In a case where the coding mode for the decoding processing target block is the block coded by the intra prediction, the intra compensation unit 107 reads the pixels corresponding to the intra prediction mode from the intra compensation memory 109 to generate a reference block. As described in Non-patent Document 1, in the intra compensation unit 107, the intra prediction that refers to a part outside the tile is performed by using previously determined pixels. The addition unit 108 performs addition of the reference block output from the intra compensation unit 107 to the prediction residual error. The decoded pixels after the addition are recorded into the intra compensation memory 109 for the intra prediction of the subsequent block.

The selection unit 110 selects an output of either the addition unit 106 or the addition unit 108 in accordance with the coding mode. The decoded image after the addition is recorded into the intra compensation memory 109 for the intra prediction of the subsequent block. The filter processing unit 111 receives the output of the selection unit 110 and performs filter processing such as deblocking filter.

According to the present exemplary embodiment, it is assumed that loop_filter_across_tiles_flag indicating whether or not the filter processing is performed between the tiles is set as 0. The pixels located outside the tile are substituted with a predetermined value in the filter processing in the filter processing unit 111.

The pixel output unit 112 refers to the tile information to calculate a memory address and records the decoded pixels in the tile in the motion compensation memory 113 and the image output memory 114.

Figure 4:
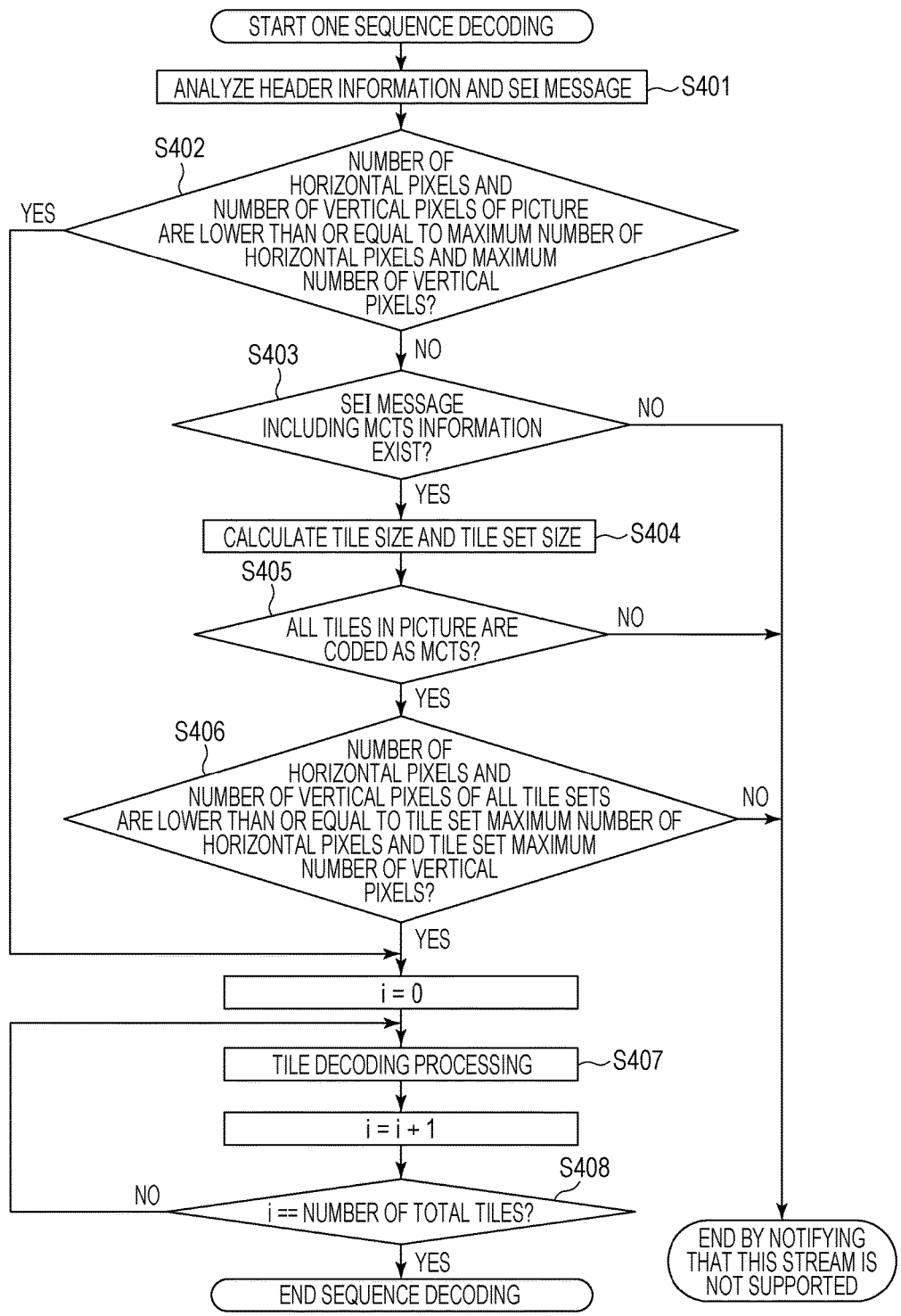
FIG. 4 is a decoding flow chart for each picture according to the first exemplary embodiment.

The tile information analysis method and the decoding method for the tile coding data in the picture in the stream analysis unit 101, the overall control unit 102, and the tile information analysis unit 103 according to the present exemplary embodiment will be illustrated by using a flow chart of FIG. 4.

First, in step S401, the stream analysis unit 101 analyzes the header information and the SEI message in the stream.

In step S402, the overall control unit 102 determines whether or not the number of horizontal pixels and the number of vertical pixels of the coding target picture are respectively lower than or equal to the tile set maximum number of horizontal pixels and the tile set maximum number of vertical pixels. In a case where the numbers are respectively lower than or equal to the tile set maximum number of horizontal pixels and the tile set maximum number of vertical pixels, the flow proceeds to step S407, and in a case where the numbers are not respectively lower than or equal to the tile set maximum number of horizontal pixels and the tile set maximum number of vertical pixels, the flow proceeds to step S403.

In step S403, the overall control unit 102 determines whether or not the MCTS SEI message exists in the stream. In a case where the MCTS SEI message exists, the flow proceeds to step S404, and in a case where the MCTS SEI message does not exist, an external part is notified of an error signal indicating that the stream is not supported, and the flow is ended.

In step S404, the tile information analysis unit 103 calculates the tile information (the number of tiles in the picture and the numbers of horizontal and vertical pixels of each tile) from the header information analyzed in step S401. The tile information analysis unit 103 also analyzes the MCTS information included in the MCTS SEI message in step S404 and calculates the number of tile sets constituting the MCTS and the numbers of horizontal and vertical pixels of the respective tile sets as the tile set information.

In step S405, the tile information analysis unit 103 determines whether or not all the tiles in the picture are coded as the MCTS on the basis of the tile information and the tile set information calculated in step S404. In a case where all the tiles in the picture are coded as the MCTS, the flow proceeds to step S406, and in a case where the tile that is not the MCTS exists, the external part is notified of the error signal indicating that the stream is not supported, and the flow is ended.

In step S406, the tile information analysis unit 103 determines whether or not the number of horizontal pixels and the number of vertical pixels of all the tile sets in the picture are respectively lower than or equal to the tile set maximum numbers of horizontal and vertical pixels. In a case where the numbers are respectively lower than or equal to the tile set maximum numbers of horizontal and vertical pixels, the flow proceeds to step S407, and in a case where the numbers are not respectively lower than or equal to the tile set maximum numbers of horizontal and vertical pixels, the external part is notified of the error signal indicating that the stream is not supported, and the flow is ended.

In step S407 and step S408, the overall control unit 102 controls the respective processing in the image decoding apparatus such that the decoding processing for all the tiles in the picture is repeatedly performed. In a case where the stream is constituted by a plurality of pictures, the processing in step S407 and step S408 is repeatedly performed until the last picture.

A description will be given of an operation in which parallel decoding of the picture having a high resolution is performed in the image decoding system illustrated in FIG. 8 by using four image decoding apparatuses provided with the above-described configuration and processing flow. Each of the image decoding apparatuses 801 corresponds to the image decoding apparatus illustrated in FIG. 1, and the intra compensation memory 109 in FIG. 1 is mounted as the SRAM 802 in FIG. 8. In addition, the motion compensation memory 113 in FIG. 1 is mounted as the DRAM 803 in FIG. 8. The decoded pixels in the tile which are decoded by each of the image decoding apparatuses 801 are only written to the directly connected DRAM 803.

Figure 8:
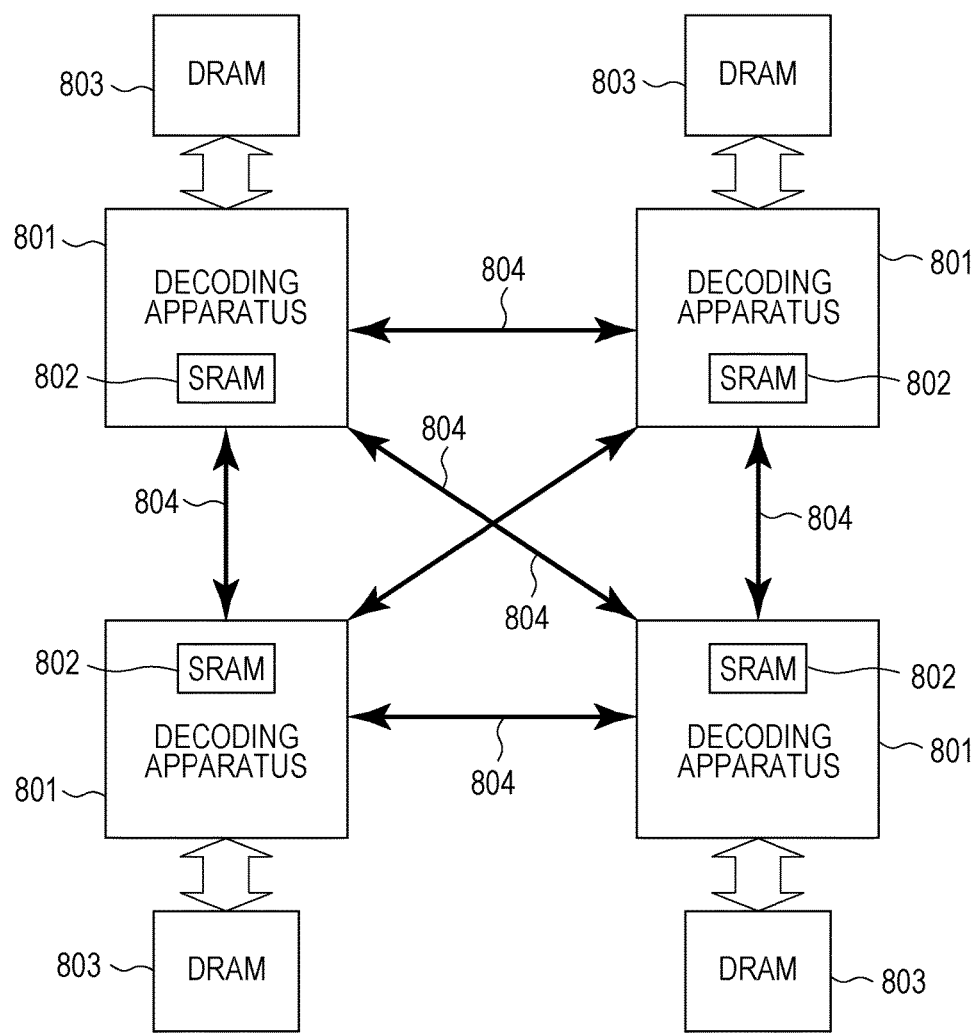
FIG. 8 illustrates an image decoding system constituted by a plurality of image decoding apparatuses.

In FIG. 8, the analysis on the header information and the analysis on the tile information and the tile set information illustrated from step S401 to step S406 of FIG. 4 are executed by one of the image decoding apparatuses 801. The analyzed header information and the tile set information decoded by each of the image decoding apparatuses 801 are transmitted to the other image decoding apparatuses 801.

When the stream coded by dividing the picture having 4096×2048 pixels illustrated in FIG. 2 into four tile sets is decoded, the respective image decoding apparatuses 801 of FIG. 8 play a role of decoding of one tile set each and execute the decoding in units of tile sets in parallel. The above-described header information includes pointer information for directly accessing the respective tile coding data (entry point offset minus1 described in Non-patent Document 1). The coding data of the tile equivalent to the tile set that is decoded by each of the image decoding apparatuses 801 itself may be input from an external part, or the coding data of the tile may be received from the image decoding apparatus that has analyzed the header via the inter-chip communication apparatus 804.

Since the number of horizontal pixels of each of the tile sets is limited to be lower than or equal to the tile set maximum number of horizontal pixels according to the present exemplary embodiment, the SRAM 802 in each of the image decoding apparatuses of FIG. 8 (the intra compensation memory 109 of FIG. 1) may be provided with a capacity for 2048 pixels. Therefore, as compared with a case in which each of the image decoding apparatuses 801 is mounted with the SRAM 802 having a capacity for 4096 pixels, it is possible to considerably reduce the memory cost.

Furthermore, according to the present exemplary embodiment, the motion compensation unit 104 of FIG. 1 does not set the motion vector that uses the pixels outside the tile set on the reference picture, as the decoding target. Thus, each of the image decoding apparatuses 801 of FIG. 8 may only refer to the DRAM 803 connected to itself and may avoid referring to the DRAMs 803 connected to the other image decoding apparatuses.

As a result, each of the image decoding apparatuses 801 can execute the motion compensation without using the inter-chip communication apparatus 804 that involves the high power consumption, and it becomes possible to realize the substantial reduction in the power consumption.

The division numbers of tiles and tile set, the numbers of horizontal and vertical pixels, the tile set IDs, and the like are not limited to the above specifications, and also the size of the usable CTB is not limited to the above size. The tile set maximum number of horizontal pixels and the tile set maximum number of vertical pixels set as the decoding support targets are not limited to the above numbers, and any values can also be used. The restriction related to the maximum size of the tile set can be applied to either the number of horizontal pixels or the number of vertical pixels of the tile set and can be applied, for example, to a product of the number of horizontal pixels and the number of vertical pixels of the tile set. In addition, the tile set maximum number of horizontal pixels and the tile set maximum number of vertical pixels are used according to the present exemplary embodiment, but the present invention is not limited to these numbers, and a setting indicating the maximum size of each of the tile sets may be used.

When all the tiles in the picture belong to the tile sets constituting the MCTS, and also the stream in which the numbers of horizontal and vertical pixels of the tile sets are restricted to be lower than or equal to the predetermined number of pixels is set as the decoding target, it is also possible to support the decoding of the picture having a still higher resolution. In this case too, each of the image decoding apparatuses 801 of FIG. 8 may avoid being mounted with the SRAM 802 that deals with 8096 pixels, and each of the image decoding apparatuses 801 may only be provided with the SRAM 802 that deals with 2048 pixels corresponding to the tile set maximum number of horizontal pixels.

In a case where the resolution of the decoding target picture is unchanged too, by increasing the number of the image decoding apparatuses, the number of pictures that can be decoded per one second can be flexibly increased in accordance with the number of the image decoding apparatuses.

It is assumed that each of the image decoding apparatuses is in conformity to the HEVC described above in Non-patent Document 1. However, the present invention is not limited to this and can also be applied to any moving image coding techniques in which the tile division and the tile set can be used.

Second Exemplary Embodiment

Figure 5:
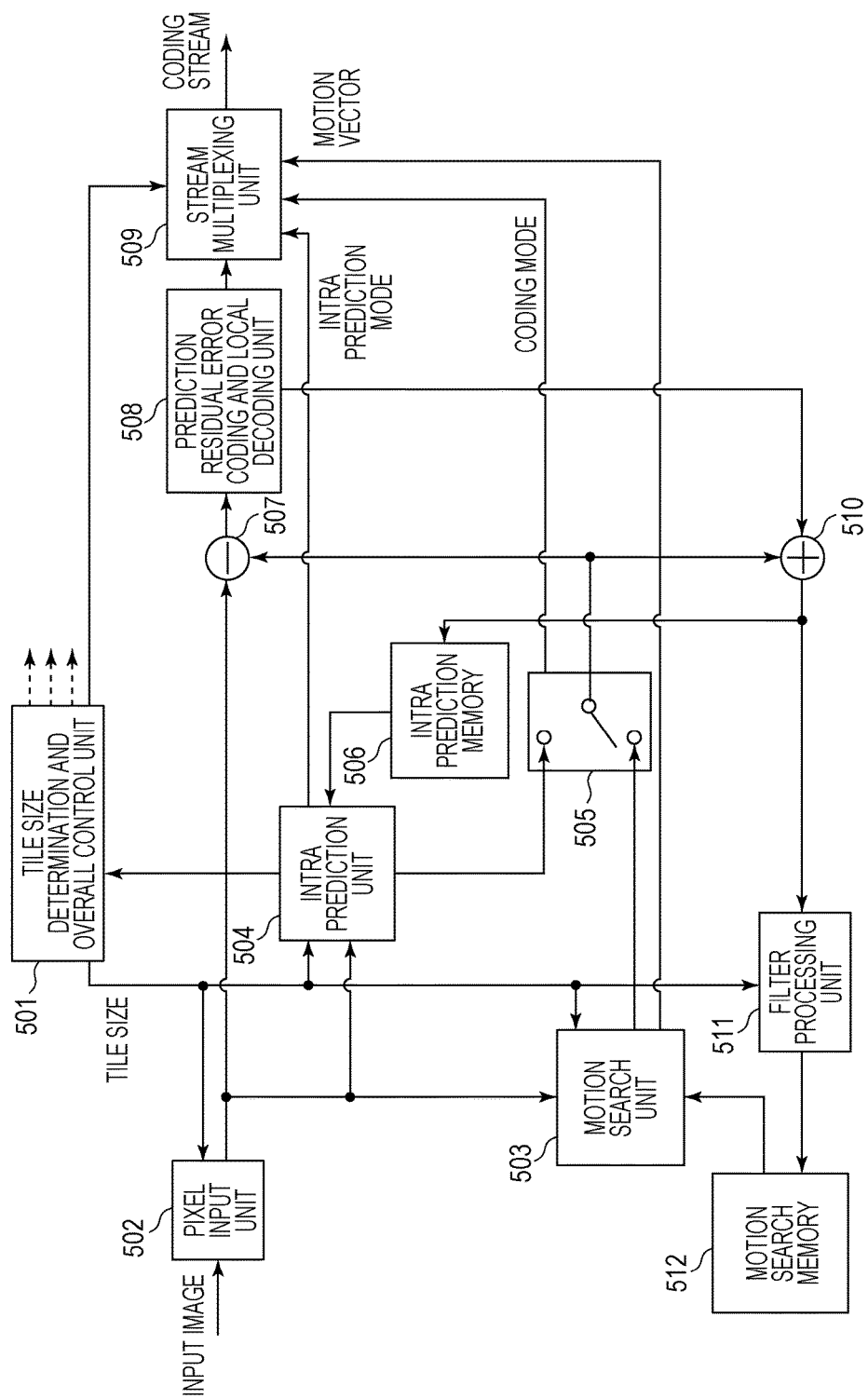
FIG. 5 illustrates an image coding apparatus according to a second exemplary embodiment.

FIG. 5 illustrates contents of an image coding apparatus that codes the respective pictures by using the image coding format according to the exemplary embodiment of the present invention. As illustrated in FIG. 5, this image coding apparatus is constituted by a tile size determination and overall control unit 501, a pixel input unit 502, a motion search unit 503, an intra prediction unit 504, a selection unit 505, an intra prediction memory 506, a subtraction unit 507, a prediction residual error coding and local decoding unit 508, a stream multiplexing unit 509, an addition unit 510, a filter processing unit 511, and a motion search memory 512.

Information related to the numbers of horizontal and vertical pixels of the picture to be used is set from an external part of the image coding apparatus in the tile size determination and overall control unit 501. As described above, the tile set maximum numbers of horizontal and vertical pixels of the respective tile sets according to the present exemplary embodiment are restricted to be lower than or equal to 2048 pixels each. In a case where the number of horizontal pixels or the number of vertical pixels of the set picture exceeds 2048 pixels, division into a plurality of tiles and use of a plurality of tile sets are to be carried out. The tile size determination and overall control unit 501 determines the tile division such that the number of horizontal pixels and the number of vertical pixels of the tile set after the division do not exceed the previously specified maximum values, for example, as in FIG. 2 and subsequently defines the tile sets constituting the MCTS.

It is noted that the sizes of the tile and the tile set can be directly designated from the external part of the image coding apparatus but are to be set not to exceed the tile set maximum numbers of horizontal and vertical pixels. In addition, as described above, in a case where the tile size is directly designated, the above-described uniform_spacing_flag is to be set as 0 in a case where the tile size is directly designated.

The determined tile information and tile set information are transmitted to the associated processing and also multiplexed on the stream as the header information and a part of the SEI message by the stream multiplexing unit 509. The pixel input unit 502 reads an input image in accordance with the tile size. The motion search unit 503 reads only the reference image belonging to the same tile set from the motion search memory 512 and generates the reference block to search for an optimal motion vector. In this motion vector search, the search is conducted only within a range where the reference pixel outside the tile set on the reference picture is not used, and the motion vector where the amount of generation codes is estimated to be the lowest is determined.

The intra prediction unit 504 reads the reference image from the intra prediction memory 506 and generates the reference block corresponding to the intra prediction mode to search for the optimal intra prediction mode, and the intra prediction mode in which the amount of generation codes is estimated to be the lowest is determined. The selection unit 505 compares the estimated amount of generation codes calculated by the intra prediction unit 504 and the motion search unit 503 with each other to determine the coding mode indicating the motion prediction or intra prediction and also selects the reference block of the motion search unit 503 or the intra prediction unit 504. The coding mode may be coded in the selection unit 505 by entropy coding. The subtraction unit 507 performs a prediction (subtraction) of the input block and the reference block. The prediction residual error coding and local decoding unit 508 calculates a quantization orthogonal transform coefficient by orthogonal transform and quantization of the prediction residual error corresponding to an output of the subtraction unit 507 and performs entropy coding (variable length coding or arithmetic coding). At the same time, the prediction residual error coding and local decoding unit 508 performs inverse quantization and inverse orthogonal transform of the quantization orthogonal transform coefficient of the prediction error for the intra prediction or the motion prediction of the subsequent block and locally decodes the prediction error.

The stream multiplexing unit 509 multiplexes the coding data of the prediction error, the coding mode, and the motion vector on each other as the coding data of the tile. The stream multiplexing unit 509 further multiplexes the tile division used for the coding as the header information and the information related to the tile set as the MCTS SEI message on the coding data of the above-described tile to be output as the coding stream illustrated in FIG. 3 according to the first exemplary embodiment.

The addition unit 510 performs the addition (the motion compensation or the intra prediction) of the prediction error that is locally decoded by the prediction residual error coding and local decoding unit 508 with the reference block output from the selection unit 505. The pixel decoded by the addition unit 510 is output to the filter processing unit 511 and recorded at the same time in the intra prediction memory 506 for the intra prediction of the subsequent block.

The filter processing unit 511 applies filter processing such as deblocking filter on the decoded block. The decoded image on which the filter processing has been applied is recorded in the motion search memory 512.

As in the present exemplary embodiment, the coding is independently performed while the numbers of horizontal and vertical pixels of the tile sets defined at the time of the coding are limited to be lower than or equal to the previously specified maximum numbers and also the restrictions of the MCTS are complied with. Accordingly, it is possible to generate the stream in conformity to the image coding format illustrated in the first exemplary embodiment. The parallel decoding processing in the plurality of image decoding apparatuses can be easily performed in this stream as illustrated in the first exemplary embodiment, and the cost reduction of the image decoding system and the decrease in the power consumption can be realized.

It is noted that the division numbers of tiles and tile sets, the maximum number of horizontal pixels, the tile set IDs, and the like are not limited to the above specifications, and also the size of the usable CTB is not limited to the above size. In addition, the tile set maximum number of horizontal pixels and the tile set maximum number of vertical pixels that can be decoded are not limited to the above numbers, and any values can be used. The restrictions related to the maximum size of the tile set can be applied to only either the number of horizontal pixels or the number of vertical pixels of the tile set and can also be applied, for example, to a product of the number of horizontal pixels and the number of vertical pixels of the tile set.

In the image coding system according to the present exemplary embodiment, it is supposed that different tile sets are decoded by different image decoding apparatuses. Therefore, the image coding apparatus performs the coding in such a setting that the deblocking filter is not applied between the tiles (loop_filter_across_tiles=0) in principle. However, the deblocking filter is not applied not only between the tile sets but also at borders between the tiles included in the tile sets in such a setting.

In the above-described case, the image coding apparatus can also perform the coding in such a setting that the deblocking filter is applied between the tiles (loop_filter_across_tiles=1). With respect also to the stream coded in the above described manner, the image decoding apparatus according to the first exemplary embodiment can perform the decoding in parallel among the image decoding apparatuses.

It is however noted that the decoding pixels of the different tile sets are not referred to at the tile set border, and a value outside the tile set is substituted with a previously specified pixel value to perform the filter processing.

Figure 9:
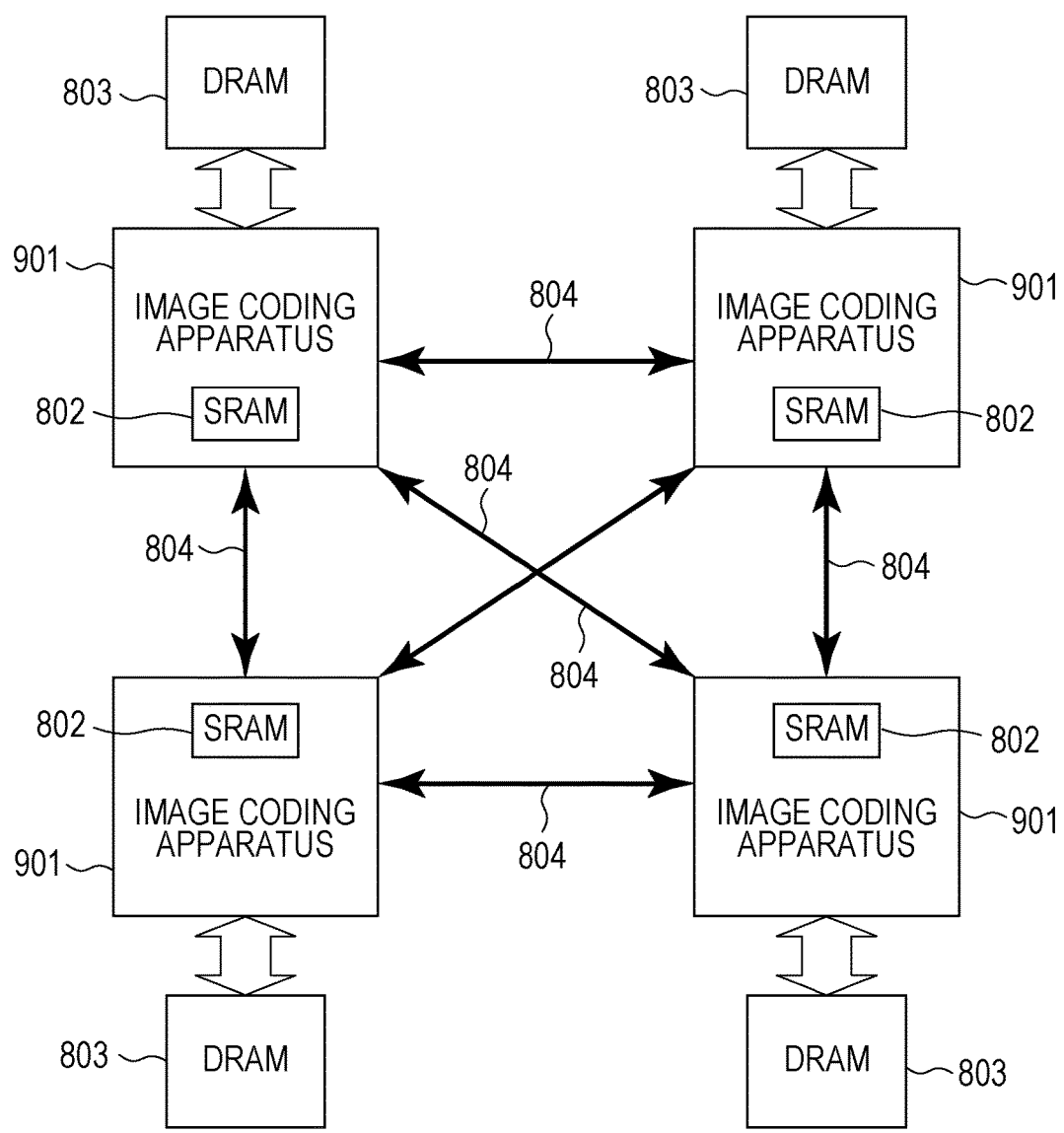
FIG. 9 illustrates an image coding system constituted by a plurality of image coding apparatuses.
Figure 10:
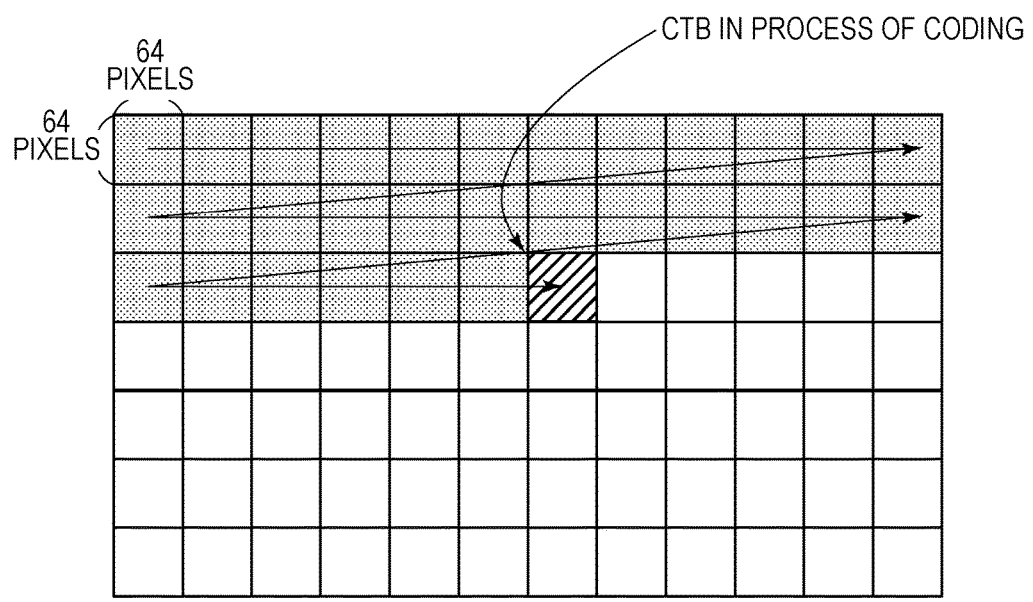
FIG. 10 illustrates coding and decoding processing orders in HEVC.

When a plurality of image coding apparatuses according to the present exemplary embodiment are used to perform the coding in parallel, it is also possible to perform the coding of the picture having a high resolution at a high speed. FIG. 9 illustrates an example of the image coding system using a plurality of image coding apparatuses, and this image coding system is constituted by four image coding apparatuses 901.

In FIG. 9, the same component elements as those in FIG. 8 are assigned with the same reference numerals of FIG. 8, and a description thereof will be omitted. An interface for inputting an original image and an interface for outputting a coding stream are omitted from FIG. 9, and a description thereof will also be omitted.

The image coding apparatus illustrated in FIG. 5 corresponds to the image coding apparatus 901 illustrated in FIG. 9. The motion search memory 512 of FIG. 5 is mounted as the DRAM 803 of FIG. 9, and the intra prediction memory 506 of FIG. 5 is mounted as the SRAM 802 of FIG. 9.

As described above, all the tiles in the picture are included in any one of the tile sets in the image coding apparatus illustrated in FIG. 5, and also the motion vector search is performed in a range where the reference pixels outside the tile set on the reference picture is not used in the motion compensation of each tile set. Thus, in a case where each of the image coding apparatuses 901 of FIG. 9 executes the coding of the tile set illustrated in FIG. 2, for example, only the reference picture on the DRAM directly connected to itself may be referred to in the motion vector search. Therefore, also when the picture having the high resolution like 4096×2048 pixels is coded, it is possible to perform the motion search and the coding without using the inter-chip communication apparatus 804 having the high power consumption.

The SRAM 802 may also avoid being provided with the capacity that deals with 4096 pixels corresponding to the number of horizontal pixels of the picture and may be only provided with the capacity that deals with 2048 pixels corresponding to the number of horizontal pixels of the tile set.

Thus, the coding of the picture is performed by adding the restriction in the image coding format of the present invention, the decrease in the power consumption and the cost reduction can be realized in the image coding system too.

Third Exemplary Embodiment

FIG. 6 illustrates the tile set maximum numbers of horizontal and vertical pixels according to the present exemplary embodiment. In the image coding, a level indicating a range of parameter values that can be decoded by the image decoding apparatus is included in the sequence parameter set, and the maximum number of pixels in the picture and the like are generally restricted in accordance with the level. In the image coding format according to the present exemplary embodiment, the tile set maximum numbers of horizontal and vertical pixels are determined in accordance with this level.

The image decoding apparatus according to the present exemplary embodiment can be realized by a similar configuration to the image decoding apparatus illustrated in FIG. 1 according to the first exemplary embodiment and the same processing contents as the flow chart illustrated in FIG. 4. It is however noted that in step S401 of FIG. 4, the stream analysis unit 101 analyzes a level included in the header information, and the tile set maximum numbers of horizontal and vertical pixels are calculated in accordance with the level. In step S401, in a case where the analyzed level is a value that is not supported, the stream analysis unit 101 notifies the external part of the error signal indicating that the stream is not supported, and the flow is ended.

In addition, the image coding apparatus according to the present exemplary embodiment can be realized by a similar configuration to the image coding apparatus illustrated in FIG. 5 according to the second exemplary embodiment. It is however noted that in FIG. 5, a level to be used is set from an external part in the tile size determination and overall control unit 501. The tile size determination and overall control unit 501 determines the time division and the tile sets constituting the MCTS so as not to exceed the tile set maximum numbers of horizontal and vertical pixels determined in accordance with the level.

As in the present exemplary embodiment, the respective image decoding apparatuses can previously determine the tile set maximum numbers of horizontal and vertical pixels to be supported in accordance with the supporting level. Thus, the SRAM size that the image decoding apparatus is to be provided with can be determined in accordance with the level, it is therefore possible to realize the cost reduction more efficiently.

In the coding apparatus too, by storing the level in the stream, the tile set maximum numbers of horizontal and vertical pixels and the like that are to be supported by the image decoding apparatus can be clarified.

It is noted that the value of level and the tile set maximum numbers of horizontal and vertical pixels in accordance with the level are not limited to the above, and any values can also be used. The restriction related to the maximum size of the tile set can be applied to only either the number of horizontal pixels or the number of vertical pixels of the tile set and can also be applied, for example, to a product of the number of horizontal pixels and the number of vertical pixels of the tile set.

Fourth Exemplary Embodiment

FIG. 7 illustrates the tile set maximum numbers of horizontal and vertical pixels according to the present exemplary embodiment. In the image coding, a profile indicating a combination of processing in which the image decoding apparatus can perform the decoding as well as the level illustrated according to the third exemplary embodiment are generally included in the sequence parameter set. In the image coding format according to the present exemplary embodiment, the tile set maximum numbers of horizontal and vertical pixels are determined in accordance with the level according to the third exemplary embodiment and the profile.

As illustrated in FIG. 7, the restrictions related to the tile set maximum numbers of horizontal and vertical pixels do not exist in the main profile, but the tile set maximum numbers of horizontal and vertical pixels are specified in accordance with the level in the MCTS profile. Therefore, in the image decoding apparatus that supports the main profile, the decoding is to be performed even in a case where the number of horizontal pixels of each of the tile sets is the same as the number of horizontal pixels of the picture. On the other hand, in the image decoding apparatus that only supports the MCTS profile, the number of horizontal pixels of each of the tile sets may only support numerical values of FIG. 7 which are determined in accordance with the level. Accordingly, as compared with the image decoding apparatus that supports the main profile, the image decoding apparatus that only supports the MCTS profile significantly reduces the size of the horizontal line buffer, and it is possible to realize the cost reduction.

The image decoding apparatus that only supports the MCTS profile according to the present exemplary embodiment can be realized by a similar configuration to the image decoding apparatus illustrated in FIG. 1 according to the first exemplary embodiment and the same processing contents as the flow chart illustrated in FIG. 4. It is however noted that in step S401 of FIG. 4, the stream analysis unit 101 analyzes the level and the profile included in the header information and calculates the tile set maximum numbers of horizontal and vertical pixels in accordance with the values of level and the profile. In step S401, in a case where the analyzed level and profile have values that are not supported, the stream analysis unit 101 notifies the external part of the error signal indicating that the stream is not supported, and the flow is ended.

In addition, the image coding apparatus according to the present exemplary embodiment can also be realized by a similar configuration to the image coding apparatus illustrated in FIG. 5 according to the second exemplary embodiment. It is however noted that in FIG. 5, the level and the profile to be used are set from the external part in the tile size determination and overall control unit 501. The tile size determination and overall control unit 501 determines the tile division and the tile sets constituting the MCTS so as not to exceed the tile set maximum numbers of horizontal and vertical pixels determined in accordance with the level and the profile.

As in the present exemplary embodiment, the respective image decoding apparatuses can previously determine the tile set maximum numbers of horizontal and vertical pixels that are to be supported in accordance with the supported level and profile. Thus, the SRAM size that the image decoding apparatus is to be provided with can be determined in accordance with the level, so that it is possible to realize the cost reduction more efficiently. In addition, since the coding apparatus also stores the level and the profile in the stream, it is possible to clarify the tile set maximum numbers of horizontal and vertical pixels and the like that are to be supported by the image decoding apparatus.

The name of the profile and the tile set maximum numbers of horizontal and vertical pixels in accordance with the level and the profile are not limited to the above, and any names and values can be used. The restriction related to the maximum size of the tile set can be applied to only either the number of horizontal pixels or the number of vertical pixels of the tile set and can also be applied, for example, to a product of the number of horizontal pixels and the number of vertical pixels of the tile set. It is also possible to easily specify the tile set maximum numbers of horizontal and vertical pixels only in accordance with the profile without using the level.

Fifth Exemplary Embodiment

The description has been given while the respective processing units illustrated in FIG. 1 and FIG. 5 are constituted by hardware according to the above-described exemplary embodiments. However, the processing performed in the respective processing units illustrated in FIG. 1 and FIG. 5 may also be configured by a computer program.

Figure 11:
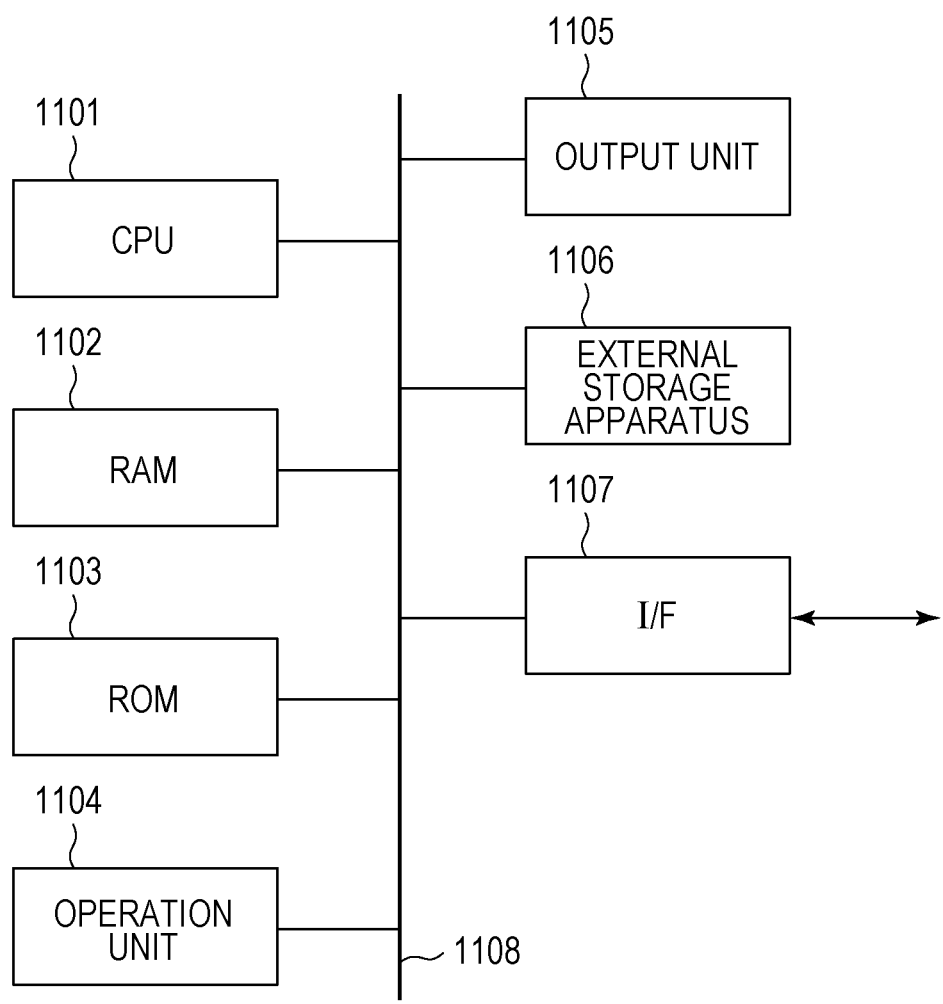
FIG. 11 is a block diagram illustrating a configuration example of hardware of a computer that can be applied to the image coding apparatuses and the image decoding apparatuses of the exemplary embodiments of the present invention.

FIG. 11 is a block diagram illustrating a configuration example of hardware of a computer applicable to the image display apparatus according to the above-described respective exemplary embodiments. A CPU 1101 performs a control on an entire computer by using a computer program or data stored in a RAM 1102 or a ROM 1103 and also executes the respective processing described such that the image processing apparatus according to the above-described respective exemplary embodiments perform the processing. That is, the CPU 1101 functions as the respective processing units illustrated in FIG. 1 and FIG. 8. The RAM 1102 includes an area for temporarily storing a computer program or data loaded from an external storage apparatus 1106, data obtained from an external part via an interface (I/F) 1107, and the like. Furthermore, the RAM 1102 includes a work area used when the CPU 1101 executes various processing. That is, the RAM 1102 is allocated, for example, as a frame memory, and other various areas can be appropriately provided. The ROM 1103 stores setting data of this computer, a boot program, and the like. An operation unit 1104 is constituted by a key board, a mouse, and the like, and various instructions can be input to the CPU 1101 when a user of this computer operates the operation unit 1104. A display unit 1105 outputs a processing result by the CPU 1101. The display unit 1105 is constituted by a display apparatus such as, for example, a liquid crystal display. The external storage apparatus 1106 is a large-capacity information storage apparatus represented by a hard disc drive apparatus. An operation system (OS) and a computer program for causing the CPU 1101 to realize the functions of the respective units illustrated in FIG. 1 and FIG. 5 are saved in the external storage apparatus 1106. Furthermore, the external storage apparatus 1106 may be a destination where the respective image data as the processing targets and the coding data corresponding to the processing results are saved. The computer program and data saved in the external storage apparatus 1106 are appropriately loaded onto the RAM 1102 in accordance with a control by the CPU 1101 and are set as processing targets by the CPU 1101. A network such as a LAN or the Internet and other device such as a projection apparatus or a display apparatus can be connected to the I/F 1107, and this computer can obtain and transmit various information via the I/F 1107. A bus 1108 connects the above-described respective units to each other. With regard to actuations constituted by the above-described configurations, the CPU 1101 plays a central role of performing the control on the actuations described above in the flow chart illustrated in FIG. 4.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-146306, filed Jul. 12, 2013, which is hereby incorporated by reference herein in its entirety.

What is claimed is:

1. An image encoding apparatus configured to encode one or more pictures to generate encoded data, the image encoding apparatus comprising:
an adding unit configured to add header information to the encoded data, the header information including a profile and a level that corresponds to the profile, the profile indicating a decoding process which is able to be performed by an image decoding apparatus, the level indicating a range of a value of a plurality of parameters including a number of pixels of the picture;
a determination unit configured to determine a number of horizontal pixels and a number of vertical pixels of a tile, wherein a tile set consists of one or more tiles that do not overlap with one another, and the tile set is independently encodable, so that the number of horizontal pixels of the tile set is N or smaller than N (N>0) and the number of vertical pixels of the tile set is M or smaller than M (M>0), N being a maximum number of horizontal pixels of a tile set and M being a maximum number of vertical pixels of a tile set, and N and M being defined according to the profile and the level; and an encoding unit configured to divide each of the one or more pictures into tile sets according to the determined number of horizontal pixels and the determined number of vertical pixels of the tile set, so that the number of horizontal pixels of the tile set is N or smaller than N and the number of vertical pixels of the tile set is M or smaller than M, and to encode the one or more pictures by performing an encoding process on a tile-set-by-tile-set basis, wherein the N defined in a case of first level is smaller than the N defined in a case of second level, if the number of pixels of the picture indicated by the first level is smaller than the number of pixels of the picture indicated by the second level, and wherein the M defined in the case of the first level is smaller than the M defined in the case of the second level, if the number of pixels of the picture indicated by the first level is smaller than the number of pixels of the picture indicated by the second level.

2. The image coding apparatus according to claim 1, further comprising:

a multiplexing unit configured to multiplex information related to the tile set determined by the determination unit as a part of supplemental enhancement information (SEI) message on a stream of the encoded data.

3. The image coding apparatus according to claim 1, wherein the encoding unit codes all tiles included in the picture on the basis of the tile set determined by the determination unit.

4. The image coding apparatus according to claim 1, wherein the determination unit determines the tile set in a manner that a size of all tile sets included in the picture is set to be smaller than or equal to a predetermined size.

5. An image decoding apparatus configured to decode encoded data of one or more pictures to which header information is added, the image decoding apparatus comprising:

a deriving unit configured to derive a number of horizontal pixels and a number of vertical pixels of a tile set from the header information, wherein the tile set consists of one or more tiles that do not overlap with one another, and the tile set is independently decodable; and a decoding unit configured to decode the encoded data by performing a decoding process on a tile-set-by-tile-set basis, the tile sets being constrained based on the number of horizontal pixels and the number of vertical pixels of the tile derived by the deriving unit, wherein the number of horizontal pixels of the tile set derived by the deriving unit is N or smaller than N (N>0) and the number of vertical pixels of the tile set is M or smaller than M (M>0), N being a maximum number of horizontal pixels of a tile set and M being a maximum number of vertical pixels of a tile set, and N and M being defined according to a profile and a level that corresponds to the profile, the profile and the level being in the header information, the profile indicating a decoding process which is able to be performed by the image decoding apparatus, the level indicating a range of a value for a plurality of parameters including a number of pixels of the picture, wherein the N derived in a case of first level is smaller than the N derived in a case of second level, if the number of pixels of the picture indicated by the first level is smaller than the number of pixels of the picture indicated by the second level, and wherein the M derived in the case of the first level is smaller than the M derived in the case of the second level, if the number of pixels of the picture indicated by the first level is smaller than the number of pixels of the picture indicated by the second level.

6. The image decoding apparatus according to claim 5, further comprising:

a stream analysis unit configured to analyze information related to the tile set which is a part of supplemental enhancement information (SEI) message in the header information.

7. The image decoding apparatus according to claim 5, wherein the decoding unit decodes all tiles included in the picture on the basis of the tile set defined according to the profile and the level.

8. The image decoding apparatus according to claim 5, wherein the tile set is a Motion-Constrained Tile Set.

9. An image encoding method configured to encode one or more pictures to generate encoded data, the image encoding method comprising:

adding header information to the encoded data, the header information including a profile and a level that corresponds to the profile, the profile indicating a decoding process which is able to be performed by an image decoding apparatus, the level indicating a range of a value of a plurality of parameters including a number of pixels of the picture;

determining a number of horizontal pixels and a number of vertical pixels of a tile, wherein a tile set consists of one or more tiles that do not overlap with one another, and the tile set is independently encodable, so that the number of horizontal pixels of the tile set is N or smaller than N (N>0) and the number of vertical pixels of the tile set is M or smaller than M (M>0), N being a maximum number of horizontal pixels of a tile set and M being a maximum number of vertical pixels of a tile set, and N and M being defined according to the profile and the level; and dividing each of the one or more pictures into tile sets according to the determined number of horizontal pixels and the determined number of vertical pixels of the tile set, so that the number of horizontal pixels of the tile set is N or smaller than N and the number of vertical pixels of the tile set is M or smaller than M, and to encode the one or more pictures by performing an encoding process on a tile-set-by-tile-set basis, wherein the N defined in a case of first level is smaller than the N defined in a case of second level, if the number of pixels of the picture indicated by the first level is smaller than the number of pixels of the picture indicated by the second level, and wherein the M defined in the case of the first level is smaller than the M defined in the case of the second level, if the number of pixels of the picture indicated by the first level is smaller than the number of pixels of the picture indicated by the second level.

10. A non-transitory computer-readable storage medium storing a program for causing a computer to execute an image encoding method to encode one or more pictures to generate encoded data, the method comprising:

adding header information to the encoded data, the header information including a profile and a level that corresponds to the profile, the profile indicating a decoding process which is able to be performed by an image decoding apparatus, the level indicating a range of a value of a plurality of parameters including a number of pixels of the picture;

determining a number of horizontal pixels and a number of vertical pixels of a tile, wherein a tile set consists of one or more tiles that do not overlap with one another, and the tile set is independently encodable, so that the number of horizontal pixels of the tile set is N or smaller than N (N>0) and the number of vertical pixels of the tile set is M or smaller than M (M>0), N being a maximum number of horizontal pixels of a tile set and M being a maximum number of vertical pixels of a tile set, and N and M being defined according to the profile and the level; and dividing each of the one or more pictures into tile sets according to the determined number of horizontal pixels and the determined number of vertical pixels of the tile set, so that the number of horizontal pixels of the tile set is N or smaller than N and the number of vertical pixels of the tile set is M or smaller than M, and to encode the one or more pictures by performing an encoding process on a tile-set-by-tile-set basis, wherein the N defined in a case of first level is smaller than the N defined in a case of second level, if the number of pixels of the picture indicated by the first level is smaller than the number of pixels of the picture indicated by the second level, and wherein the M defined in the case of the first level is smaller than the M defined in the case of the second level, if the number of pixels of the picture indicated by the first level is smaller than the number of pixels of the picture indicated by the second level.

11. An image decoding method configured to decode encoded data of one or more pictures to which header information is added, the method comprising:

deriving a number of horizontal pixels and a number of vertical pixels of a tile set from the header information, wherein the tile set consists of one or more tiles that do not overlap with one another, and the tile set is independently decodable; and decoding the encoded data by performing a decoding process on a tile-set-by-tile-set basis, the tile sets being constrained based on the number of horizontal pixels and the number of vertical pixels of the tile, wherein the number of horizontal pixels of the tile set is N or smaller than N (N>0) and the number of vertical pixels of the tile set is M or smaller than M (M>0), N being a maximum number of horizontal pixels of a tile set and M being a maximum number of vertical pixels of a tile set, and N and M being defined according to a profile and a level that corresponds to the profile, the profile and the level being in the header information, the profile indicating a decoding process which is able to be performed by the image decoding apparatus, the level indicating a range of a value for a plurality of parameters including a number of pixels of the picture, wherein the N derived in a case of first level is smaller than the N derived in a case of second level, if the number of pixels of the picture indicated by the first level is smaller than the number of pixels of the picture indicated by the second level, and wherein the M derived in the case of the first level is smaller than the M derived in the case of the second level, if the number of pixels of the picture indicated by the first level is smaller than the number of pixels of the picture indicated by the second level.

12. A non-transitory computer-readable storage medium storing a program for causing a computer to execute an image decoding method to decode encoded data of one or more pictures to which header information is added, the method comprising:

deriving a number of horizontal pixels and a number of vertical pixels of a tile set from the header information, wherein the tile set consists of one or more tiles that do not overlap with one another, and the tile set is independently decodable; and decoding the encoded data by performing a decoding process on a tile-set-by-tile-set basis, the tile sets being constrained based on the number of horizontal pixels and the number of vertical pixels of the tile, wherein the number of horizontal pixels of the tile set is N or smaller than N (N>0) and the number of vertical pixels of the tile set is M or smaller than M (M>0), N being a maximum number of horizontal pixels of a tile set and M being a maximum number of vertical pixels of a tile set, and N and M being defined according to a profile and a level that corresponds to the profile, the profile and the level being in the header information, the profile indicating a decoding process which is able to be performed by the image decoding apparatus, the level indicating a range of a value for a plurality of parameters including a number of pixels of the picture, wherein the N derived in a case of first level is smaller than the N derived in a case of second level, if the number of pixels of the picture indicated by the first level is smaller than the number of pixels of the picture indicated by the second level, and wherein the M derived in the case of the first level is smaller than the M derived in the case of the second level, if the number of pixels of the picture indicated by the first level is smaller than the number of pixels of the picture indicated by the second level.

* * * * *